Figure 1:
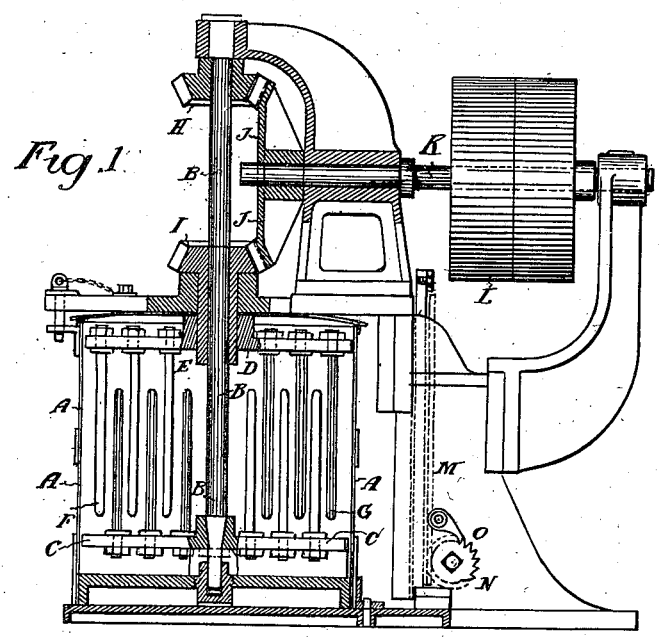

J. GLOOR.
PROCESS FOR THE MANUFACTURE OF CHOCOLATES.
APPLICATION FILED JUNE 25, 1915.

1,201,573.

Patented Oct. 17, 1916.

Inventor-
Jakob Gloor.
By B. Singer
Atty.

UNITED STATES PATENT OFFICE.

JAKOB GLOOR, OF RUTHERGLEN, SCOTLAND.

PROCESS FOR THE MANUFACTURE OF CHOCOLATES.

1,201,573.   Specification of Letters Patent.   Patented Oct. 17, 1916.

Application filed June 25, 1915. Serial No. 36,254.

*To all whom it may concern:*

Be it known that I, JAKOB GLOOR, of 19 Dunard road, Rutherglen, Scotland, confectioner, have invented a new and useful Process for the Manufacture of Chocolates, the same being also applicable for the making of soluble powdered cocoa, of which the following is a specification.

My invention relates to a process for the manufacture of all sorts of eating and dessert chocolates, the coating of all chocolates, the caramelizing of milk and sugar for milk chocolate, and the caramelizing of all kinds of nut paste for all filling purposes, as well as for the roasting of the cocoa-bean for making easily soluble powdered cocoa, and has for its object to reduce the cost of manufacture of such chocolates, and, through this rapid roasting and cooking process, retain all the cocoa-butter present in the cocoa-bean, and all the valuable chemical constituents required in standard special chocolates, and thereby obtain a much finer flavored chocolate than hitherto.

According to my invention, I roast, cook and pulverize the cocoa-beans or nuts by means of friction, in place of by steam or such like heating medium, which friction brings up a heat from say 270° to 350° Fahrenheit, and, at the same time, if desired, I convert the sugar—which is not in any way previously treated or prepared—into caramel, the two bodies being dealt with simultaneously in the manufacture of chocolates, the process being effected from anything between 35 and 60 minutes.

In cases where cocoa-beans of good quality containing a high percentage of butter are to be dealt with, the heat engendered by friction need not be allowed to rise above 270° F. or even lower, while, where hard beans with a lower percentage of butter are in question, higher temperatures are necessary to bring out the full flavor which can be attained by my new process.

Any suitable machine may be used in the process to serve the joint purpose of roasting, cooking and pulverizing the beans, mixing the powder with the sugar and raising the necessary temperature by friction, the only essential being that sufficient churning and rubbing of the particles may take place to liberate the necessary heat. For example, as a type of apparatus which will perform the process, a machine can be used wherein two sets of rapidly rotating paddles or the like, interlocking in their paths in a well-known manner, are used to effect the purpose. In making soluble powdered cocoa there is, of course, no mixing of sugar.

Figure 2:
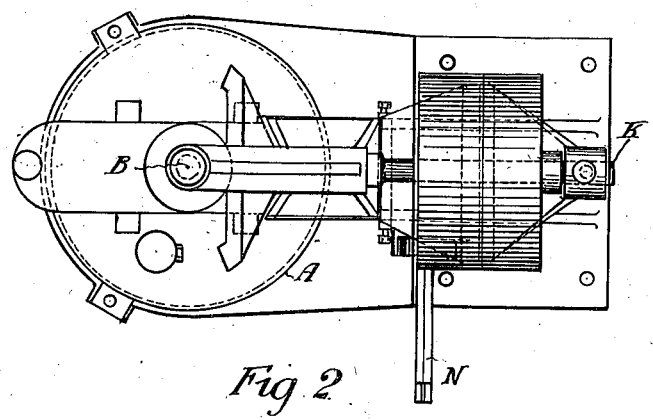

In the accompanying drawing a preferred form of machine for carrying my process into practice is shown, in which:

Figure 1 is a sectional elevation of an apparatus used for the manufacture of chocolates and soluble powdered cocoa. Fig. 2 is a plan of half the machine.

Referring to the drawing, A is the cylindrical vat or tank for containing the material to be treated, the inner walls of which are lined with a suitable material adapted to prevent the radiation of heat and of an appropriate thickness.

B is a vertical shaft mounted centrally and capable of rotating within the center of the apparatus adapted to be rotated with an extremely high speed. Upon the end of said vertical shaft and capable of rotating with the same, is mounted a disk C. A corresponding disk D is mounted to revolve in the upper part of the apparatus by the mediary of a sleeve E through which the said vertical shaft D passes and revolves loosely. The disks C and D are designed to carry a series of arms and scrapers F, G. One set of said arms or scrapers F, G projects upwardly and the other downwardly and they revolve relative with each other in concentric paths or circles. Rotary motion in opposite directions is given to the vertical shaft B carrying the disk C and the sleeve E carrying the disk D by means of bevel pinions H, I, mounted upon the two devices. Meshing with the two bevel pinions H, I aforesaid, is a bevel wheel J, which is mounted on a shaft K, having a pair of driving pulleys L by which the shaft is driven and the arms and scrapers contained within the apparatus are rotated. The vat or tank A is raised and lowered by a rack and pinion device M put in motion by a handle N and controlled by a pawl and ratchet O.

Claims:

1. A process for the manufacture of chocolates consisting in subjecting the cocoa beans to a churning and rubbing action, liberating the heat necessary for roasting, cooking and pulverizing the beans by the friction developed during said action, caramelizing sugar by said heat, and mixing it with the pulverized beans, substantially as described.

2. A process for the manufacture of chocolates consisting in subjecting the cocoa beans to a churning and rubbing action, liberating the heat necessary for roasting, cooking and pulverizing the beans by the friction developed during said action, caramelizing sugar by said heat, mixing it with the pulverized bean, and finally roasting, cooking and pulverizing the beans by said heat for providing a paste for filling purposes, substantially as described.

3. A process for the manufacture of milk chocolates consisting in the application of friction for caramelizing the milk and sugar, substantially as described.

4. A process for the manufacture of soluble powdered cocoa consisting in the application of friction, and in the roasting, cooking and pulverizing of the cocoa beans thereby, substantially as described.

In witness whereof I affix my signature.

JAKOB GLOOR.